Dec. 21, 1954  D. M. UMPHREY  2,697,352
TRANSIENT PRESSURE GAUGE
Filed Jan. 8, 1952  3 Sheets-Sheet 1

INVENTOR.
Donald M. Umphrey
BY
Lippincott & Smith.
ATTORNEYS

Dec. 21, 1954   D. M. UMPHREY   2,697,352
TRANSIENT PRESSURE GAUGE
Filed Jan. 8, 1952   3 Sheets-Sheet 2

INVENTOR.
Donald M. Umphrey
BY
Lippincott & Smith
ATTORNEYS.

Dec. 21, 1954  D. M. UMPHREY  2,697,352
TRANSIENT PRESSURE GAUGE
Filed Jan. 8, 1952  3 Sheets-Sheet 3

INVENTOR.
Donald M. Umphrey
BY
Lippincott & Smith
ATTORNEYS

United States Patent Office 2,697,352
Patented Dec. 21, 1954

2,697,352

TRANSIENT PRESSURE GAUGE

Donald M. Umphrey, Palo Alto, Calif., assignor to Pacific Electric Manufacturing Corporation, a corporation of California Application January 8, 1952, Serial No. 265,377

9 Claims. (Cl. 73—397)

This invention relates generally to an improved type of pressure gauge, and more particularly to a gauge responsive to a pressure range which includes transient pressures extending substantially below and above that of the atmosphere.

The gauge of the present invention is particularly applicable for measuring transient pressures such as those developed in circuit breakers during intervals of the "break." If such a circuit breaker, for example, is of a type which requires a carload or more of oil for the arc extinguishing medium, energy of the order of one to five million kva. may be expended very rapidly and instantaneous pressures varying from 1 or 2 to 3,000 pounds or more per square inch absolute may be encountered. The higher pressures are developed as a result of explosive-like violence obtaining at the time of the break owing to the large order of energy expenditure in the tank. Thus, the oil that comes within the arc influence is vaporized and, along with the other products of oil deterioration, forms a bubble in the tank depths. The formation of such a bubble results in rapid displacement of the oil mass upward in the direction of the air space above the liquid. The pressures below atmospheric pressure are a result of the oil mass having been rapidly displaced, added to by some condensation of the vapors and gases. As such reduced pressure exists in the tank depths, the oil mass rapidly returns downward only to be bounced upward again by the resiliency of the bubble. Hence a train of damped oscillations, measurable in transient pressures, is established. Adding further to the complexity of the pressure trend is the fact that restriking of the arc may occur at any instant or may be purposely re-established in certain types of interrupters. Accordingly, it is measurement of pressures of the foregoing nature which is desired.

In order that instantaneous pressures throughout this large range may be accurately measured, a gauge responsive to positive and negative pressures (relative to atmospheric presure) must be provided. Further, the scale for the gauge must be capable of readable divisions of 3,000 or more units.

Gauges of the prior art suffer disadvantages which disqualify them as measuring devices for pressures of the aforementioned extent. Such gauges generally may be classified as strain gauges, variable reactance gauges, or resilient gauges.

Strain gauges normally comprise resistive bridges which may be balanced or unbalanced to yield the desired pressure indication. These gauges, however, are subject to influence by stray magnetic or electric fields, which influence is of a measurable order due to the fact that the bridge voltages are normally low and the fields due to the short-circuit currents on the one hand and the recovery voltages on the other may be very large. Further, the resistor is a substantially linear element, and thus to attain readings throughout large ranges of measurement, enormous scales must be provided.

Among the variable reactance measuring devices, probably the capacitor is most used as a responsive element. Ordinarily one plate is stationary and the other is moved relative thereto in accordance with the quantity to be measured. If such a gauge were to be employed in the present situation, the sensitivities thereof would prove a serious defect as extremely sensitive measurements would be provided at the upper end of the scale (where the plates are closely spaced and the capacity is approaching infinity) in contrast to the insensitive measurements of pressures in the vicinity of atmospheric pressure. Further extreme shielding is particularly necessary in the vicinity of the gap and in general is required with all types of reactance devices. Also, absolute isolation from oil is imperative to preserve the dielectric constant of the capacitors. Compensation for the time constants associated with all of the reactive devices must also be made and hence these devices are, in general, unsatisfactory for use in the proposed situation.

The resilient gauges are ordinarily of a type employing a spring, the tension of which is varied in accordance with the quantity to be measured. The spring, as ordinarily used, is also a linear device, and hence scales which would provide indications of 3,000 or more units would be too crowded to yield accurate readings.

Considered broadly the present invention comprises, as a pressure sensitive element, a resilient diaphragm one side of which is exposed to the fluid wherein the pressure is to be measured. Facing at least one side of the diaphragm and coaxial therewith there is positioned an annular stop, the face of which is so contoured that as the deflection of the diaphragm changes more or less of the radius at its periphery comes into contact with the stop and is therefore prevented from moving further. This effectively changes the area of the diaphragm which is subject to deflection, and therefore its stiffness and degree of response to a given increment of pressure.

In its most generally useful form as used to measure transient pressures above and below atmospheric for the specific purpose above set forth, the side of the diaphragm, which would become convex at pressures below atmospheric, is left free, the stop, being contoured annularly either in steps or in a continuous curve, convex toward the axis facing the side of the diaphragm toward which it deflects at pressures above atmospheric. For more specialized purposes, where sensitivity in some intermediate portion of the scale is of particular interest, the diaphragm may be pre-stressed toward the side to which increased pressure will deflect it over a dome-like stop, from which only the center of the diaphragm is initially free but from which it lifts progressively to increase the effective area. After the full area of the diaphragm becomes effective it may if desired, again be reduced in effective area by a second stop such as that first described to decrease the sensitivity for still higher pressures.

For translating the deflection into readable values an ordinary mechanical multiplier may be used. For the specific purposes of this invention, however, an electro-mechanical transducer is much more valuable. Specifically it is preferred to use a transducer tube of the electronic type wherein the mechanical motion of the diaphragm changes the spacing of electrodes and hence the amplification factor.

It is accordingly an object of the present invention to provide a pressure gauge which will measure pressures extending over large ranges and which ranges include atmospheric pressure.

A further object of the present invention is to provide a pressure gauge having graduated sensitivity throughout such extended ranges.

Still a further object of the present invention is the provision of a rugged instrument which is dependable and which may be economically manufactured.

Another object of this invention is the provision of a pressure gauge which is not materially subject to the influence of stray electric or magnetic fields.

A still further object of the present invention is the provision of a pressure gauge which affords a high degree of protection in the event of pressures increasing to high values with explosive violence.

It is a still further object of the present invention to provide a pressure gauge which admits of a substantially uniform degree of accuracy in readings throughout extended ranges of pressure.

Other and further objects of the instant invention will be apparent to those skilled in the art from a reading of the following detailed description thereof, taken in conjunction with the drawings wherein.

Figures 1, 2:
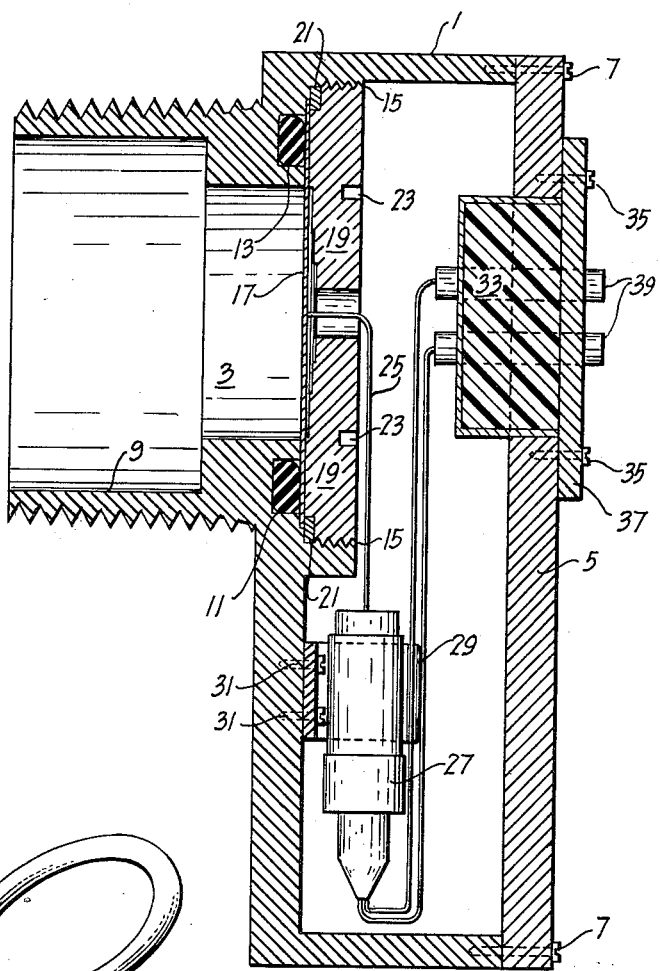
Fig. 1 is a view in cross-section showing typical structure which may be employed in a pressure gauge of the present invention.
Fig. 2 is an exploded view in perspective showing the diaphragm, stop and oil seal as embodied in the construction of Fig. 1.
Figure 3:
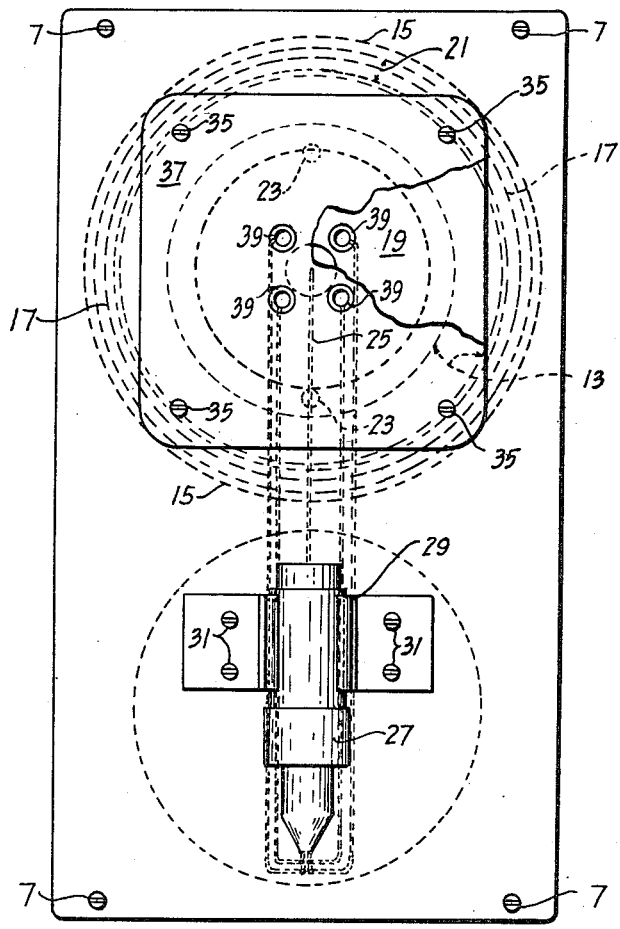
Fig. 3 is a view of the structure of Fig. 1 taken in side elevation.

Referring now to the drawings, and particularly to Figs. 1 and 2, a housing 1 is provided with an opening 3 and a cover 5. This housing may be cast or machined from steel or other suitable material or, if desired, may be formed of material chosen primarily for its electrical shielding properties. The cover 5 is secured to the housing 1 by means of the bolts 7, hence access may be readily had to the interior of the housing when desired. About the opening 3 in the housing 1 there is provided a threaded shoulder 9 which is adapted for attachment to the oil tank of a circuit breaker (not shown) or other device developing transient pressures. Also, about the opening 3, but in the inner wall of the housing 1, there is located an annular recess 11 which is adapted to contain an O ring 13 for the purposes of providing an oil seal between the housing and breaker. A further annular recess 15 is provided in the inner wall of housing 1 about the opening 3 (Figs. 1 and 3). A diaphragm 17 is adapted to be inserted into this recess, and a stop 19 provided with a diaphragm positioning flange 21 is then secured against the diaphragm by means of threaded engagement with the inner walls of the housing 1. Spaces 23 are provided in the back side of the stop in order that a spanner wrench may be employed in tightening the stop against the diaphragm, and thus securing it against the O ring 13.

A coupling 25 is secured to the diaphragm at the center thereof and extended to an electromechanical transducer 27. This coupling may comprise, for example, a nickel tube which is sufficiently light and rigid as to relay diaphragm deflection accurately without distortion due to material flexure. The transducer 27 is secured within spring clamps 29 which are attached to the inner wall of housing 1 by means of the screws 31. The RCA tube No. 5734 has been found to be desirable for use as the transducer element for this invention. The anode of this tube is extended through a tube diaphragm which forms a pivot for this electrode and an air-tight seal for the tube. By connecting the coupling 25 to the anode extension, movement of the coupling causes a variation in electrode spacing in the tube which alters the amplification factor of the tube. Hence electrical quantities may be obtained from the tube output which are proportional to the movement of the coupling 25.

Electrical connections for the tube are provided through a suitable receptacle or coupling 33 which penetrates the cover 7 and is secured thereto by means of screws 35 extending through the coupling flange 37. Sockets 39 are provided in the coupling for making electrical connections from the exterior of the housing 1 to the tube 27. In this manner power may be supplied to the tube, and the signal produced by the tube which is indicative of the pressure applied to diaphragm 17 may be transferred externally of the housing for utilization.

The particular construction employed for the stop 19 (Fig. 2) is such that the diaphragm, when deflected in the direction of the stop, is limited in radius of deflection by engagement with the successively positioned interior shoulders of the stop. In actual use the diaphragm substantially forms tangents to each of these concentric shoulders. In this manner non-linearity is obtained between pressures above that of the atmosphere and diaphragm deflection in the direction of the stop. Hence a scale approaching a logarithmic scale is employed for pressure readings above atmospheric. The particular structure of the stop 19 as shown in Fig. 2 is very desirable, as it may be manufactured with ease. Further, three or four different stops may be employed interchangeably in the same gauge, and hence, almost any desired scale may be obtained by merely substituting one stop for another.

Figure 2A:
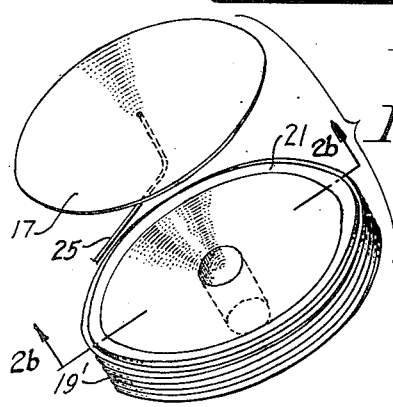
Fig. 2a is an exploded view in perspective of a modification of the stop of Fig. 2.
Figure 2B:
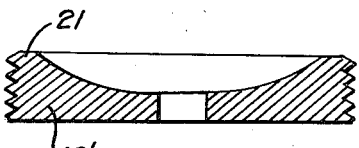
Fig. 2b is a view in cross section of the stop of Fig. 2a as seen along the plane marked by the line 2b—2b.

In Fig. 2a there is shown a modified form of the stop of Fig. 2. This stop 19' includes a single recess into which the diaphragm 17 is adapted to be depressed. The curvature, of course, is greater toward the center of stop 19', so that greater deflections of diaphragm 17 are limited to the central areas of the diaphragm, see Fig. 2b. Hence, in the stop of Fig. 2a a solid backing is provided for progressive areas of the diaphragm in contrast with the tangential contact which is obtained with the stop 19 of Fig. 2. However, as the recess contained in the stop 19' must necessarily follow an exponential curve in order that an approximate logarithmic scale may be provided for pressures above atmospheric, this particular stop is somewhat more complex to manufacture than the stop of Fig. 2. Hence, although either stop is usable, that as shown in Fig. 1 is more desirable from an economy of manufacture standpoint.

Figure 4:
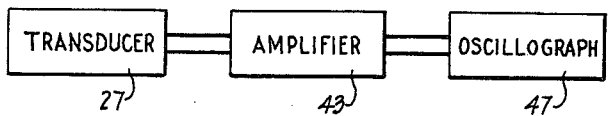
Fig. 4 is a block diagram of electrical equipment suitable for use with the present invention.

In Fig. 4 there is shown a block representation of a circuit suitable for use with the gauge of the present invention. In this figure the electromechanical transducer 27 is connected to feed an amplifier 43 which in turn connects to an oscillograph or indicating device 47. The output of the tube 27 is very high (½ watt or more), and thus this tube also serves as a pre-amplifier. The additional amplifier may be used if desired. A cathode follower or other impedance matching circuit may be provided to present a low impedance coupling for an electromagnetic oscillograph.

In operation oil pressure exerted through the shoulder 9 bears against the diaphragm 17 to deflect it into the stop 19. The O ring 13 is actually expanded in an axial direction with increase of pressure because the pressure tends to compress it along a radial direction from the shoulder axis, thereby to increase the effectiveness of the seal. Deflection of the diaphragm imparts movement to the coupling 25, which movement varies the gain of transducer 27. Hence this tube produces an electrical quantity in accordance with the pressure applied to the diaphragm 17. By employing the oscillograph 47, a visual indication or record of transient pressures during the "break" may be had. It should be remembered, however, that when the oil bubble formed at the time of the break collapses, pressures less than that of the atmosphere are applied to the diaphragm 17, thus to cause it to be deflected in the direction away from the stop 19. Coupling 25 is then moved in the proper direction to cause the electrical output of tube 27 to be representative of these pressures.

Figure 5:
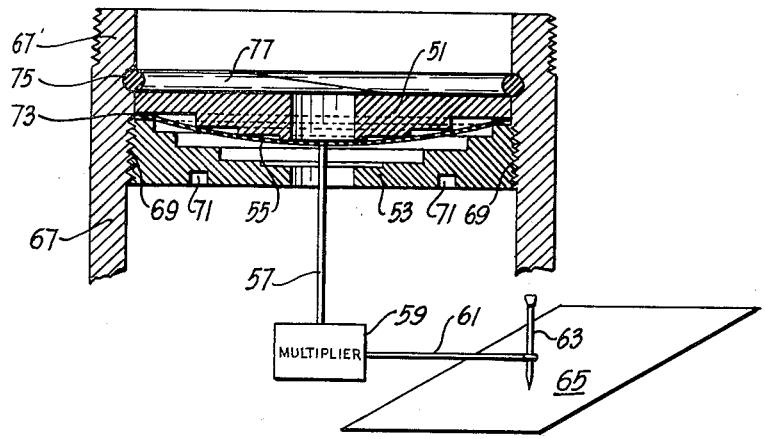
Fig. 5 is a view taken in cross-section of a modified form of the present invention employing a pair of stops and also showing associated responsive equipment.

The modified form of the invention suitable for accurately measuring dispersed pressure groups is shown schematically in Fig. 5. In this view spaced opposed stops 51 and 53 are shown in cross-section. These stops may assume either the shape of stop 19 (Fig. 2) or stop 19' (Fig. 2a) and accordingly only the single view of the modified form of the invention is deemed necessary for a complete understanding of the operation thereof. A diaphragm 55 is clamped between the stops so that the contoured or graduated face of stop 51 bows it in the direction of stop 53 but free of the face thereof. Thus the degree of contour and the stiffness factor of the diaphragm determine the extent of pre-loading of the device which in turn determines the minimum sensitivity, at the lower end of the scale, of that particular combination of stop and diaphragm.

As in the previous embodiment, a rigid coupling 57, of, for example, nickel tubing is secured to diaphragm 55 and extended to actuate, in this instance, a mechanical multiplier 59 which in turn drives an arm 61 that moves a marking instrument 63 along the paper 65 thereby to yield a record of diaphragm deflection and hence pressure.

The supporting structure for the stops 51 and 53 may assume many of varied forms dependent mainly upon the particular purpose for which the measuring device is employed. However, one form of supporting structure is shown in Fig. 5 which is suitable for use in connection with a circuit breaker. A tubular member 67 which may, for example, be similar to the shoulder 9 of housing 1, as shown in Fig. 1, is adapted for connection at the upper end 67' thereof to a circuit breaker tank (not shown). A portion of the internal surface of the tube 67 is threaded at 69 so that stop 53, which is also threaded along the periphery thereof, may be secured in tube 67 by means of a spanner wrench adapted to fit the recesses 71 and hence turn the stop. After stop 53 is secured in position diaphragm 55 with coupling 57 is inserted into tube 67 through the end 67' to rest against the uppermost portion of stop 53. Next a ring gasket 73 is placed against the upper side of diaphragm 55 and stop 51 is inserted through the end 67' of tube 67 to bear against the diaphragm and gasket. An annular groove 75 is provided in the inner wall of tube 67 to accommodate a resilient ring 77 of the expansible type. Thus, force equal in magnitude to the amount of preloading of the diaphragm is applied to stop 51 to force it in a downward direction so that the diaphragm is bowed, as shown, and ring 77 is then snapped into groove 75 thereby to maintain stop 51 in place.

Figure 6:
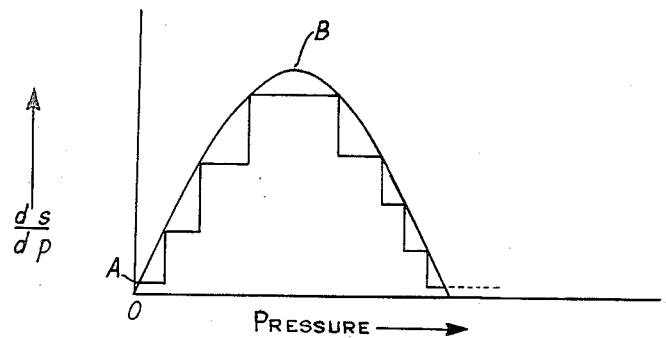
Fig. 6 shows a set of curves exemplifying results obtainable from the modified form of the present invention.

The operation of this particular embodiment may be explained most easily with reference to the curves of Fig. 6 wherein the horizontal axis is plotted in pressure per square inch on the diaphragm and the vertical axis represents the first derivative of diaphragm deflection (S) with respect to pressure per square inch (P). The stepped curve A of Fig. 6 is obtainable when stops contoured in the manner of those shown at 51 and 53 in Fig. 5 are employed. The horizontal portions of the steps represent the pressure intervals during which the derivative of diaphragm deflection with respect to pressure is a constant. Such derivative is constant only when the effective area of the diaphragm subject to deflection is also constant. Accordingly, during the transitions from smaller to larger areas of diaphragm subject to deflection, the left hand vertical traces of the steps are obtained and transitions from greater to lesser areas account for the right hand vertical portions of the steps. The curve A assumes the asymmetrical shape as shown because the stop 53 includes one more concavity than stop 51 and hence the individual areas of the diaphragm included between adjacent concentric circles of stop 51 do not equal the areas of the diaphragm confined between adjacent circles of contact with stop 53. Thus, the effective lever arms, measured along the diaphragm radius, of the individual areas differ by varying lengths thereby causing the derivative of diaphragm deflection with respect to pressure to assume the vertically displaced values as shown.

The extremities of the curve are each displaced slightly from the horizontal axis because the diaphragm is always deflected to some extent in response to pressure differentials. Hence the derivative is never zero. The extremity denoting the higher pressures is dotted because the aperture in stop 53 permits continued diaphragm deflection with increasing pressure until the elastic limit of the diaphragm is reached.

The lower extremity of the curve is, however, of even greater interest because the size of the aperture in stop 51 determines the horizontal extent of this extremity and hence the location of the remaining steps which comprise curve A. If the aperture is made to correspond in size to a pin hole, the steps will be displaced to the right along the horizontal axis and hence readings of concentrated pressure variations of relatively high magnitude will be obtained. By appropriately sizing the aperture in stop 51 the response of the measuring device may be deployed throughout the extensive ranges herein mentioned. Also, since the entire diaphragm deflection, with the exception of the initial bow, is confined to relatively narrow ranges of pressure, extreme accuracy of reading is hence obtained. For example, the pressure range engrossed by curve A may include the initial pressure oscillation established in the breaker and the device of Fig. 5 thus affords a thorough study of this region.

In Fig. 6 the curve B is drawn to show generally the outline of stepped curve A. Actually a close approximation to the shape of curve B could be obtained if a great number of steps or concentric ridges were included in the stops 51 and 53. In fact, it should now be apparent that any desired type of curve may be obtained from the apparatus of Fig. 5. The factors affecting the shape of the curve are diaphragm stiffness and stop contour. Hence, when desired, these factors may be selected to provide, for example, a response curve confined to extremely narrow pressure ranges in which case substantially the entire diaphragm deflection would provide a measure of small pressure increments with correspondingly greater accuracy. Further, the curve could be deployed for any selected pressure increment appearing throughout the extended pressure ranges herein contemplated. Therefore, the value of this embodiment is far reaching, particularly when it is desired to explore transient phenomena.

Although the present invention has been explained in connection with the application thereof to a circuit breaker, it should be readily apparent that numerous occasions admit of the employment of such a gauge. Particularly in the mechanical field, readings of instantaneous, transient and cyclic pressures are desired as measures of machine performance. Further, large ranges of pressure may be engrossed by such machines as the air compressor, the steam engine, gasoline and diesel combustion engines and the like. These ranges may include negative pressures as, for example, during the intake stroke of a compressor or internal combustion engine, friction losses in the intake pipes and valves reduce the pressure of air admitted to the machines to below atmospheric pressure. Negative pressures may also be encountered in the multiple expansion type steam engines, as well as in various other mechanical devices. The positive pressures may extend to 800 pounds per square inch (or even higher at times) during the compression strokes; and possibly as high as 2,000 pounds per square inch during the explosion or power strokes. Accordingly, use of the gauge of the present invention provides accurate readings with appropriate sensitivities throughout such extensive ranges.

Hence, it should be re-emphasized that the combination of the linear scale for negative pressures with the logarithmic scale for positive pressures permits the use of a compact scale readable over a range of 3,000 or more to one.

What is claimed is:

1. A pressure gauge responsive to ranges of pressure comprising a pressure sensitive diaphragm supported for deflection, a pair of stops respectively positioned on either side of the diaphragm, one of said stops being contoured to bow the diaphragm in the direction of the other stop and said other stop being contoured to present progressively increasing areas of contact to the diaphragm as increasing pressure is applied thereto, a coupling secured to the diaphragm and movable with deflection thereof, and means responsive to movement of the coupling to provide a quantity in accordance with the pressure applied to the diaphragm.

2. A pressure gauge responsive to ranges of pressure comprising a pair of spaced opposed stops, a pressure sensitive diaphragm positioned between the stops and adapted to be deflected in the direction of one of the stops when pressure is applied thereto through the other stop, said other stop being contoured to bow the diaphragm convexly in the direction of said one stop and said one stop being substantially concavely contoured in the direction of the diaphragm thereby to progressively confine the effective area of the diaphragm subject to deflection to successively inner areas thereof when increasing pressure is applied to the diaphragm, a coupling secured to the diaphragm and movable therewith, and means responsive to the movement of said coupling to provide a measurable quantity in accordance with the pressure applied to the diaphragm.

3. The pressure gauge of claim 2 wherein said means responsive to the coupling movement comprises an electro-mechanical transducer.

4. The pressure gauge of claim 2 wherein said means responsive to the coupling movement comprise an electro-mechanical transducer and an oscillograph in electrical series connection.

5. The pressure gauge of claim 2 wherein said means responsive to the coupling movement comprises a mechanical multiplier.

6. The pressure gauge of claim 2 wherein said means responsive to the coupling movement comprise a mechanical multiplier having a marking arm actuable thereby to provide a record of pressure exerted against the diaphragm.

7. The pressure gauge of claim 2 wherein the contoured surface of each of said stops is progressively graduated.

8. The pressure gauge of claim 2 wherein the surface of each of said stops which contacts the diaphragm is smoothly contoured.

9. The pressure gauge of claim 2 wherein one of said stops is progressively graduated along the contoured surface thereof and the other of said stops is smoothly contoured along the diaphragm contacting surface thereof.

References Cited in the file of this patent

UNITED STATES PATENTS

| Number | Name | Date |
|---|---|---|
| 2,155,419 | Gunn | Apr. 25, 1939 |
| 2,220,902 | Hastings et al. | Nov. 12, 1940 |
| 2,636,385 | Andres | Apr. 28, 1953 |
| 2,641,742 | Wolfe et al. | June 9, 1953 |

FOREIGN PATENTS

| Number | Country | Date |
|---|---|---|
| 186,010 | Switzerland | Aug. 31, 1936 |
| 503,293 | Great Britain | Apr. 4, 1939 |